United States Patent

[11] 3,601,151

| [72] | Inventor | Ronald Winnard<br>Johannesburg, Transvaal, Republic of South Africa |
|---|---|---|
| [21] | Appl. No. | 696,244 |
| [22] | Filed | Jan. 8, 1968 |
| [45] | Patented | Aug. 24, 1971 |
| [73] | Assignee | Latex Products (Proprietary) Limited<br>Johannesburg, Transvaal, Republic of South Africa |
| [32] | Priority | Mar. 29, 1969 |
| [33] | | South Africa |
| [31] | | 1810/67 |

[54] NONRETURN VALVES FOR MEDICAL USES
1 Claim, 5 Drawing Figs.

[52] U.S. Cl. .................................................. 137/525,
128/218 NV
[51] Int. Cl. .................................................. F16k 15/14
[50] Field of Search .......................................... 137/525;
128/218 NV, 349 BV, 216

[56] References Cited
UNITED STATES PATENTS
3,267,950  8/1966  Langdon ........................ 137/525
2,591,148  4/1952  Green ............................ 137/525
2,743,724  5/1956  Gispen .......................... 128/216
2,922,419  1/1960  Bednarz ........................ 128/218 NV
FOREIGN PATENTS
733,890  7/1955  England ......................... 128/349 BR

*Primary Examiner*—Laverne D. Geiger
*Assistant Examiner*—William H. Wright
*Attorneys*—Robert E. Clemency, John W. Michael, Gerrit D. Foster, Baynard H. Michael, Paul R. Puerner, Joseph A. Gemignani and Andrew O. Riteris

ABSTRACT: A medical valve used with arrangements to pass fluids into and from the body. The valve member is constituted by a chamber into which a stem portion protrudes, the stem portion being provided with a bore which passes fluid into the chamber and through the valve. The stem acts as a seat for the valve closure member which is an elasticlike sock which opens by expansion under pressure exerted from the stem side of the valve. The valve is closed when the pressure is removed and the sock contracts under its own elasticity around the stem. The valve can also be operated by causing a needle to pierce the sock member, the sock material is of a nature that it is self-sealing when the needle is removed.

PATENTED AUG 24 1971  3,601,151

NONRETURN VALVES FOR MEDICAL USES

This invention relates to nonreturn valves for use in various medical applications. In using the word "medical" the applicant will be understood to include the field of surgery as well.

In many circumstances it is necessary to provide a valve which will permit fluid to pass in one direction only. For instance, in urological work it is often necessary to anchor a catheter in the bladder for draining purposes. The type of catheter employed is one in which two concentric tubes are employed, the inner tube acting as the drain and the outer tube as a duct through which air may be passed to a balloon at the bladder end of the catheter. The outer tube has a valve towards its proximal end which permits air to be passed into the balloon but which prevents the escape of air from the balloon. When the balloon is inflated it forms an obstruction which prevents the catheter escaping down the urethra. When, however, the catheter has to be removed the balloon is deflated by opening the valve. In a known valve of the kind in question the valve comprises a spigot which engages the catheter, an axial bore in the spigot, a cap which fits over the free end of the spigot and which is matingly bored to engage, say, an air syringe, and a valve closure member located between the spigot and the cap. The closure member is a rubber of like disc which is located in a chamber defined between the cap and spigot athwart the bore in the device. The size of the chamber is such as to permit air from the syringe under pressure to find its way around the periphery of the disc and along the catheter tube to the balloon. Return flow of air is intended to be prevented by the disc being forced rearwardly against the walls of the chamber formed by the cap. In practice, however, the simple disc arrangement does not work sufficiently well and escape past the disc is a frequent occurrence. Frequently, the inflation of the balloon is achieved by puncturing the disc with a needle associated with the syringe, forcing air through the needle and then withdrawing the needle and syringe. The material of which the disc is formed is of a self-sealing character and escape cannot occur through the body of the disc. Whatever the nature of the chamber in which the disc is lodged it is the experience of the applicant that the disc is not a satisfactory closure member for such valves and an object of the present invention is to provide a valve with a more efficient closure device.

According to the present invention a valve mechanism includes a body defining a fluid path through the valve, a bored stem constituting part of the path and a chamber in which the stem is located and which also constitutes part of the path, the chamber being adapted to accommodate a sock which slidingly engages over the stem, the sidewalls of the sock yielding to permit fluid to pass through the stem into the chamber and being urged into engagement with the stem by pressure fluid on the downstream side of the valve.

Preferably the valve body is made up of two parts which mate spigot and socket fashion and which collectively define the chamber in which the stem is located.

According also to the invention the spacing of the stem tip relative to the adjacent chamber wall is such as to prevent displacement of the sock from the stem when the device is in use.

The sock is preferably made of a material which acts to seal itself when punctured by a needle.

In order to illustrate the invention an example is described hereunder with reference to the accompanying drawings in which.

Figure 1:
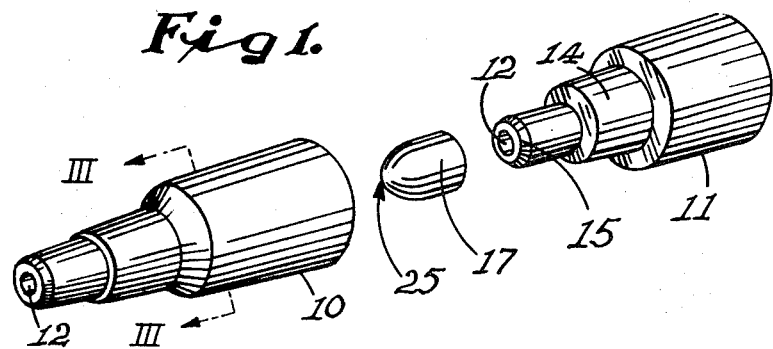
FIG. 1 is an exploded perspective view of the valve.
Figure 2:
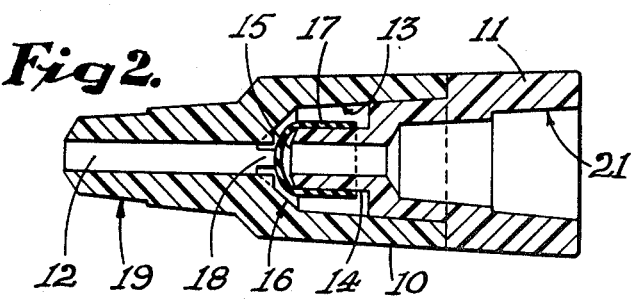
FIG. 2 is a longitudinal section through the valve.
Figure 3:
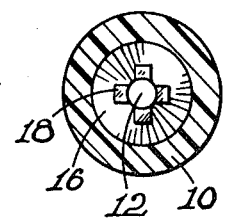
FIG. 3 is a section on the line III—III of FIG. 2.

The valve in one form includes a plastic body formed of two sections 10 and 11 which engage in spigot and socket fashion, a bore 12 defining a fluid path through the device being coaxial with the sections 10 and 11 making up the body. The socket portion 10 of the body defines a substantial chamber 13 into which a stem 14 fast with the spigot member 11 projects, the stem 14 surrounding part of the bore 12 through the valve.

In the example under consideration an airspace is provided around the stem 14 and the tip 15 of the stem is spaced from the base 16 of the socket chamber 13. A small element 17 of rubber or rubberlike material is located over the stem 14 in the manner of a sock and this element 17 constitutes the valve closure member. In the preferred forms of the invention the adjacent floor zone of the socket compartment is provided with upstanding ridges 18 against which the sock 17 may abut when in extended position under pressure.

The leading end 19 of the socket part 10 of the valve body is coupled into, say, a catheter 20 of the kind referred to earlier, while the trailing end 21 of the spigot part 11 of the body is equipped with a connecting cup or compartment into which a conventional syringe 22 may be fitted.

Figure 4:
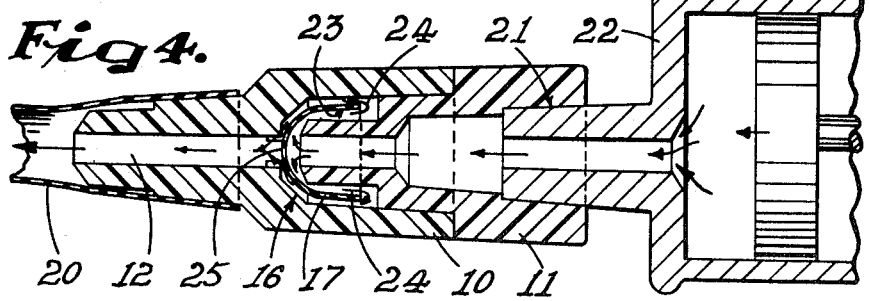
FIG. 4 is a section with parts broken away showing the valve in use with air or a liquid passing through the valve.
Figure 5:
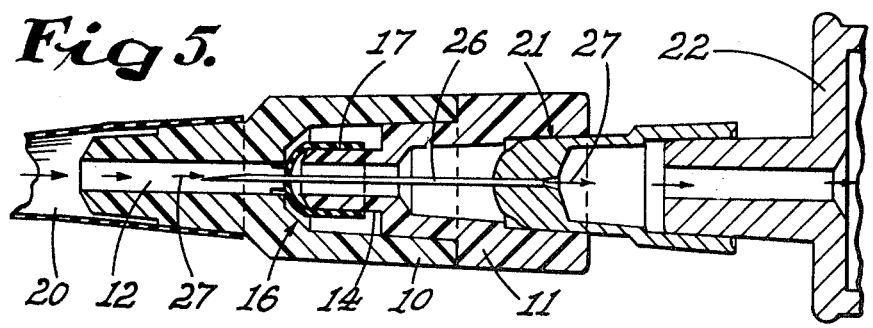
FIG. 5 is a section similar to that of FIG. 4 in which air or a liquid is being withdrawn through the valve.

By pumping air into the valve, for instance, as shown in FIG. 4 of the drawings, the sock 17 bellows outwardly under pressure so that the air may pass through the valve between the stem 14 and the adjacent sidewalls 23 of the sock 17. This is illustrated by arrows 24. As a rule the sock will also move along the stem until its leading portion 25 engages the ridges 18 in the floor of the compartment. The inner end of the outer tube of the catheter 20 will then balloon to prevent its escape from, for example, the bladder. Pressure air downstream of the valve will exert itself against the base 25 of the sock 17 and thus prevent airflow in the reverse direction through the valve. To deflate the balloon as illustrated in FIG. 5 a needle 26 may be passed through the base 25 of the sock 17, the needle carrying a bore through which the air escapes as indicated by arrows 27.

On removal of the needle 26 the material of which the sock 17 is made acts to seal the sock automatically. Tests have shown that materials are available which may be punctured by a needle many times before the operation of the valve is likely to be impaired.

The valve described above may also be used for removing samples of, say, blood from the human body or for dosing a body with a fluid. For instance, where blood is to be removed, the valve will be located at the end of a needle which is located in a vein. To remove a sample of blood, the needle at the end of a syringe arrangement is passed through the valve sock, the blood is caused to move into the cylinder of the syringe on retraction of the piston and the needle is then pulled clear of the valve which promptly seals itself. A similar procedure is involved where fluid is to be passed into the body.

By suitably designing the chamber of the valve body the blood in the vein can be caused to aspirate into the chamber. In this manner the arrangement itself indicates whether or not the needle tip is located in the vein.

In an alternative form of the invention the sock is made out of a suitable synthetic resinous material. In this case the sock will be more in the nature of a cup or cap which fits over the stem in, preferably, a sliding relationship.

Tests have shown that the valve arrangement of the invention may be relied upon to work efficiently over an extended period.

Many more examples of the invention exist each differing from the other in matters of detail only but in no way departing from the essence of the invention as set out in the appended claims. Thus, for instance, the spigot and socket engagement between the body sections 10 and 11 may include threaded zones which permit the sections to engage threadingly.

I claim:

1. A medical valve for use with a syringe comprising a body including a bore and a chamber communicating with said bore and having a base defined by a wall, a stem located in said chamber and having a tip with a bore therein and being spaced from said chamber wall, said stem also including a connecting cup remote from said tip and communicating with said stem bore for anchoring said valve to a medical appliance, and a sock which is made of a material which acts to seal itself when punctured by a needle and which is slidingly received over said stem in covering relation to said tip for movement toward said chamber wall in response to pressure applied through said stem bore and for movement into sealing engagement with said stem to close said stem bore in response to pressure applied through said body bore, said sliding movement of said sock being limited by engagement with said chamber wall and with said tip, said sock also having sidewalls yielding under pressure applied through said stem bore to permit fluid to pass from said stem into said chamber and through said body bore.